United States Patent [19]

Lapeyre

[11] Patent Number: 4,852,719
[45] Date of Patent: Aug. 1, 1989

[54] MODULAR SCREW CONVEYOR

[75] Inventor: James M. Lapeyre, New Orleans, La.

[73] Assignee: The Laitram Corporation, New Orleans, La.

[21] Appl. No.: 149,912

[22] Filed: Jan. 27, 1988

Related U.S. Application Data

[63] Continuation of Ser. No. 888,282, Jul. 24, 1986, abandoned, which is a continuation of Ser. No. 537,345, Sep. 29, 1983, abandoned.

[51] Int. Cl.⁴ ............................................. B65G 33/32
[52] U.S. Cl. .................................... 198/666; 198/658; 198/677
[58] Field of Search .............. 198/662, 664, 666, 674, 198/676, 677, 658

[56] References Cited

U.S. PATENT DOCUMENTS

| | | | |
|---|---|---|---|
| 233,320 | 10/1880 | Brewer | 198/662 |
| 296,477 | 4/1884 | Smith | 198/662 X |
| 375,931 | 1/1888 | Gunckel | 198/676 |
| 1,090,956 | 3/1914 | Zinteck | 198/666 |
| 1,644,649 | 10/1927 | Lamy | 198/664 X |
| 2,118,289 | 5/1938 | Birkenbeuel | 198/666 |
| 2,721,647 | 7/1951 | Witworth | 198/666 |
| 2,815,852 | 12/1957 | Harrer | 198/666 |
| 2,845,167 | 7/1958 | Heiken | 198/662 X |
| 3,178,210 | 4/1965 | Dickinson | 198/666 X |
| 3,705,644 | 12/1972 | Kawchitch | 198/671 X |
| 4,187,030 | 2/1980 | Godley | 198/666 X |
| 4,334,785 | 6/1982 | Blach | 198/666 X |
| 4,624,577 | 11/1986 | Vannier et al. | 198/677 |
| 4,691,818 | 9/1987 | Weber | 198/666 |

FOREIGN PATENT DOCUMENTS 883421 6/1953 Fed. Rep. of Germany ...... 198/666

Primary Examiner—Joseph E. Valenza
Attorney, Agent, or Firm—Weingarten, Schurgin, Gagnebin & Hayes

[57] ABSTRACT

A screw conveyor composed of a plurality of modules mated end to end and of identical integrally molded construction. Each module is molded of a suitable plastic material and has integrally formed therewith a cylindrical body, a coaxially disposed tube within the body, and a web helically disposed between the coaxial tube and the cylindircal body. The module includes ends mateable with corresponding ends of like modules to provide a screw conveyor of intended length and which is rotatable as a single unitary structure. Each module may have a sheave integrally molded thereon for mating with a V-belt drive. Alternatively, the modules can be of open form each having a helical web molded on a central tube preferably having a non-circular and adapted for end to end mating with like modules to provide a screw conveyor of desired length. This open type of screw conveyor can be readily retrofitted to systems having conventional metal conveyor screws.

15 Claims, 4 Drawing Sheets

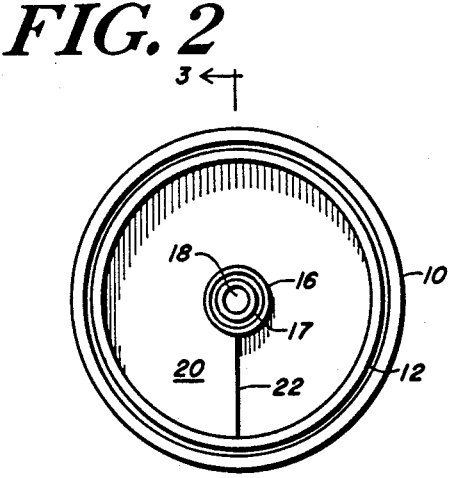
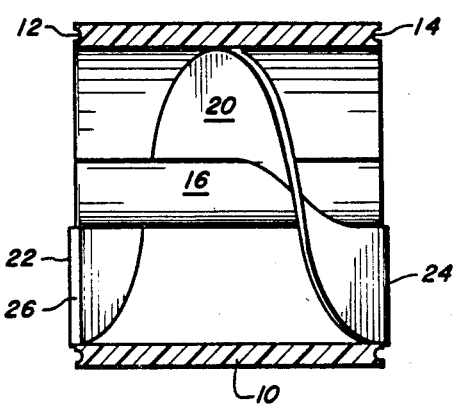
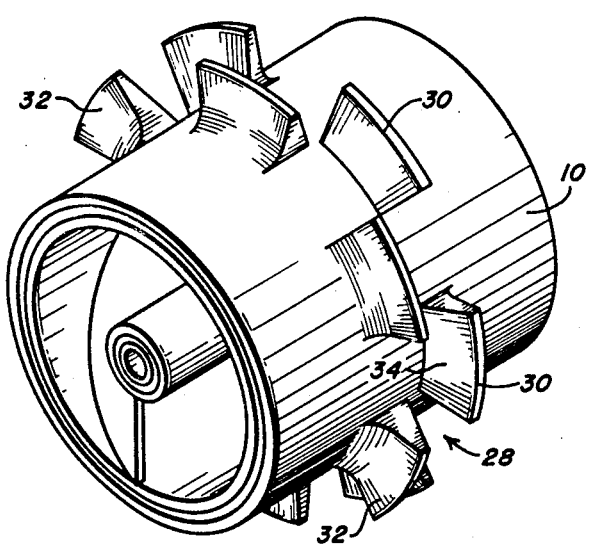
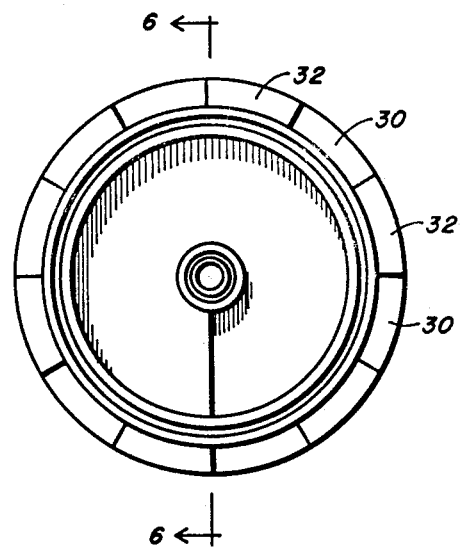
FIG. 1
FIG. 2
FIG. 3
FIG. 4
FIG. 5

MODULAR SCREW CONVEYOR

This application is a continuation of Ser. No. 888,282 filed July 24, 1986, now abandoned, which was a continuation of Ser. No. 537,345 filed Sept. 29, 1983 now abandoned.

FIELD OF THE INVENTION

This invention relates to screw conveyors, and more particularly to an integrally constructed modular screw conveyor molded of a plastic material.

BACKGROUND OF THE INVENTION

Screw conveyors are well known for the transport of bulk material. Such conveyors generally include a helical screw disposed within a housing, often of trough like form, and rotatable about its longitudinal axis to cause propulsion of bulk material along the length of the screw. Conveyors of known construction are usually fabricated of metal and are constructed to an intended finished size to provide a conveyor of intended length. Screw conveyors have also been constructed of modular or segmented form to provide sections which can be assembled into a complete conveyor of a desired length. Examples of segmented or modular conveyors are shown in U.S. Pat. Nos. 349,233; 525,194; 1,867,573; 2,394,163; 2,492,915 and 3,178,210.

SUMMARY OF THE INVENTION

The present invention provides a screw conveyor composed of identical end to end mated modules, each module being of integral plastic molded construction. Each module includes a body of cylindrical configuration, a tube coaxially disposed within the cylindrical body and having an opening extending therethrough, with a web helically disposed between the coaxial tube and cylindrical body. The ends of the body and coaxial tube are configured to sealingly engage like ends of mated modules, and the respective ends of the helical web include surfaces mateable with corresponding surfaces of the modules. The modules are axially mated to form a conveyor of desired length, the mated modules being retained in engagement by a tensile member such as a rod disposed through the aligned openings of the coaxial tubes and operative to provide an intended compressive force on the engaged modules. Alternatively, the modules can be secured in engagement by other means such as flanges on the ends of the body. The module body, coaxial tube, and helical web are integrally molded of a suitable plastic material, typically by an injection molding process. Each module may include a sheave integrally formed with the body which is composed of a plurality of spaced segments to define a V-groove configured to mate with a V-belt of an exterior drive. Alternatively, sprocket teeth may be integrally formed with the module body to mate with a chain drive, or other driving means can be employed.

In the embodiment described above, the helical web is integrally formed within a surrounding tube which provides a self-enclosure for the helical screw. The conveyor of the present invention can also be embodied in open form in which the module comprises a central tube preferably having a non-circular opening, about which the helical web is integrally molded. The ends of the central tube and ends of the web are mateable with the ends of the modules to provide a conveyor of desired length. The modules are retained in compressive engagement by a tensile member such as a shaft of non-circular cross-section extending through the aligned non-circular openings of the central tubes, the rod also serving as a torsional drive shaft for the mated modules. This open type of screw conveyor driven by a central shaft is adapted to be readily retrofitted to existing conveyor systems which presently employ conventional metal conveyor screws.

The molded plastic conveyor of this invention offers major benefits over screw conveyors of conventional construction. The assembled modules offer smooth effectively continuous surfaces throughout the length of the conveyor with no hardware or other obstructions along the conveying surfaces. The novel conveyor is easily cleaned and can be molded of a variety of materials compatible with and suitable for particular operational purposes. The conveyor is not subject to rust or corrosion, as with many conveyors, and is of much less weight than a metal conveyor of the same size. The modular construction allows a single unitary module to be manufactured and stocked for assembly as necessary to achieve conveyors of different lengths. The modules can be easily shipped to an installation site and assembled on site for use. The conveyor can also be readily disassembled into its component modules such as for cleaning, shipping, or repair.

DESCRIPTION OF THE DRAWINGS

The invention will be more fully understood from the following detailed description taken in conjunction with the accompanying drawings, in which:

FIG. 1 is a pictorial view of a screw conveyor module embodying the invention;

FIG. 2 is an end view of the module of FIG. 1;

FIG. 3 is a sectional view taken along lines 3—3 of FIG. 2;

FIG. 4 is a pictorial view of an embodiment similar to that of FIG. 1 and including an integrally molded sheave thereon;

FIG. 5 is an end view of the module of FIG. 4;

DETAILED DESCRIPTION OF THE INVENTION

Figure 6:
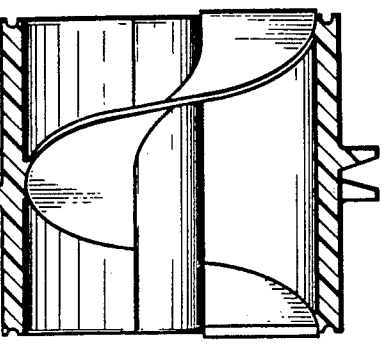
FIG. 6 is a sectional view taken along lines 6—6 of FIG. 5.

Referring to FIGS. 1–3 of the drawing, there is shown an integrally molded module which is mateable with like modules to form a screw conveyor of intended length. The module is molded of a suitable plastic material such as polyethylene, polypropylene or polyurethane and has integrally formed therewith all essential constituents of the screw conveyor. The module includes a body 10 of tubular configuration having on the ends thereof circular grooves 12 and 14, respectively, for accommodation of an O-ring seal between mated modules. A tube 16 is coaxially disposed within body 10 and having an opening 18 extending therethrough, with a web 20 helically disposed between the inner surface of body 10 and outer surface of tube 16. The tube 16 includes on the respective ends thereof circular grooves 17 for accommodation of an O-ring seal. The web 20 is slightly less than one helical pitch length terminating in respective ends 22 and 24 which include radially parallel surfaces 26 adapted to confront corresponding surfaces of like modules. Thus, the surface 26 of helix end 22 is adapted to confront the oppositely facing edge of end 24 of an adjacent module. The web ends extend outward of the confronting ends of body 10 typically by approximately 1/2 the wall thickness of the web, as illustrated. By having the length of the helical web slightly less than the helical pitch it is possible to injection mold the module by conventional molding techniques since as seen from FIG. 2 the two halves of an injection mold can open axially of the module which, because its helical length is slightly less than one helical pitch, presents no undercuts to the mold halves. Typically, the web length is about one percent less than the pitch length to provide sufficient clearance for mold tooling.

An embodiment similar to that of FIGS. 1–3 is shown in FIGS. 4–6 and includes a sheave integrally molded with the conveyor module. The sheave 28 is provided around the body 10 centrally disposed between the respective ends of the body, the sheave being composed of alternating segments. A first array of segments 30 is disposed around the body 10 in spaced circumferential arrangement. A second array of segments 32 is axially spaced from the segments 30 and is circumferentially disposed about body 10 in spaced position staggered from the position of the segments 30, as illustrated. The confronting surfaces 34 and 36 of respective segments 30 and 32 define a V-groove, best seen in FIG. 6, configured to mate with a V-belt of an exterior drive. The module is otherwise the same as described above with respect to FIGS. 1–3. The staggered arrangement of the segments 30 and 32 allow injection molding by conventional injection molding techniques since the staggered arrangement as seen from FIGS. 4–5 permits the mold halves to open axially of the module and presents no undercuts to the mold halves.

Figure 7:
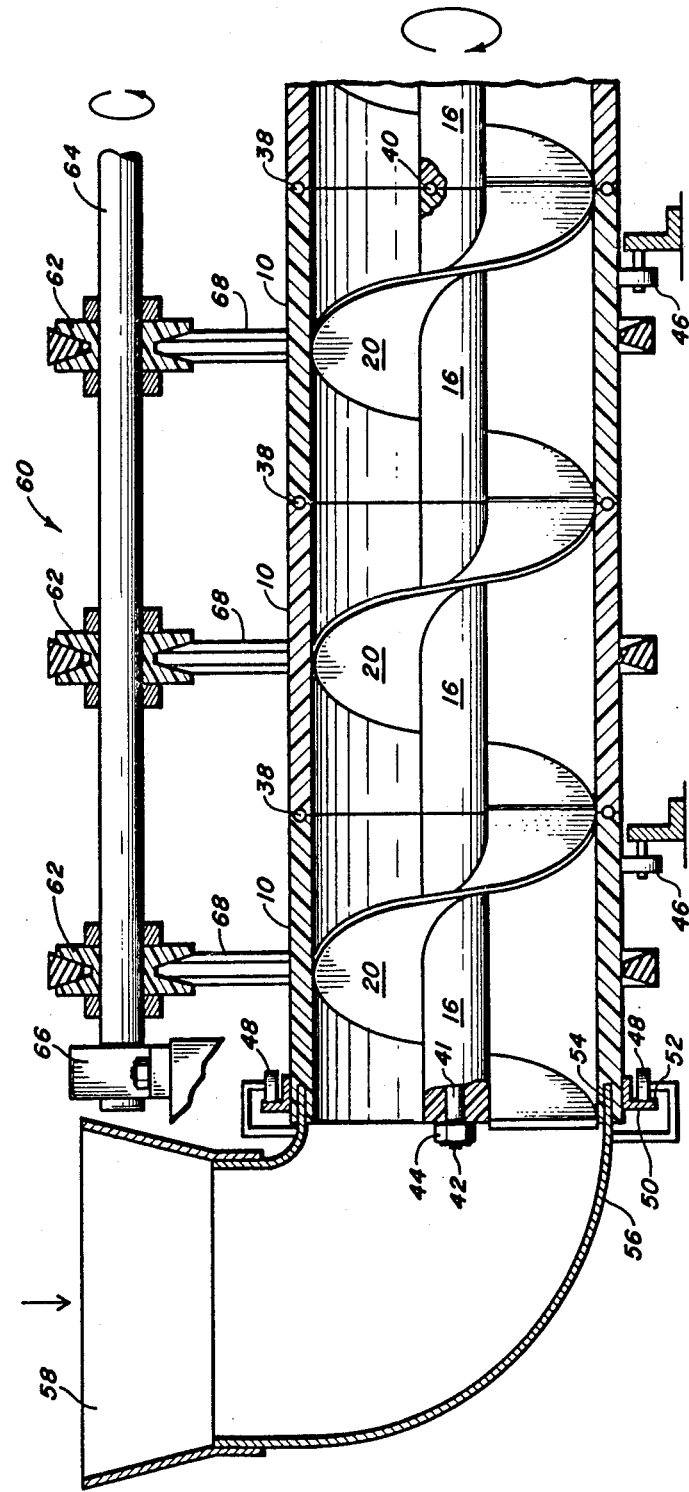
FIG. 7 is a sectional side view of a screw conveyor embodying the invention and composed of the modules of FIGS. 1–3.

The module of FIGS. 1–3 is axially mated with like modules, as shown in FIG. 7, to form a conveyor of desired length. Each of the modules is aligned with the ends of adjacent bodies 10 in engagement with an interposed O-ring 38, and with the ends of adjacent tubes 16 in engagement with an interposed O-ring 40. The helical webs 20 have their edges confronting to provide an effectively continuous helical screw disposed within the continuous tubular body formed by the mated modules. Since the web is slightly less than one helical pitch length, small spaces exist between the confronting web ends of mated modules. Typically, the gap between confronting web ends is about 0.1 inch for a web of eight inch diameter. The small spaces between the confronting ends of the helical web are of little consequence to the ability of the assembled screw to convey most products.

The small spaces may be filled in with material which is the same as or compatible with that of the module. For example, molded strips of plastic material can be inserted into the small spaces between web ends and fused therein, such as by hot gas welding, to produce a helical web having fully continuous surfaces. The elimination of the small gaps is useful in some applications such as where sanitary conditions require. For most conveying purposes, the small spaces are not of any consequence.

The mated modules are maintained in engagement by a tensile member 41 disposed within the openings 18 of tubes 16. This member typically is a metal rod 41 having threaded ends 42 and fasteners 44 which are tightened to provide an intended compressive force on the engaged modules. Alternatively, the tensile member can be a wire, plastic, or other rope disposed within the openings 18 of tubes 16 and tensioned by appropriate fasteners on the respective ends of the rope. In cases where the conveyor is subject to changes in temperature, it would be preferable to have a tensile member which allows for expansion and contraction of the conveyor while maintaining the axial compressive force on the mated modules. The tensile member should be of a material having thermal expansion and contraction characteristics in relation to those of the modules to maintain a compressive load on the mated modules even during temperature cycling.

Figure 8:
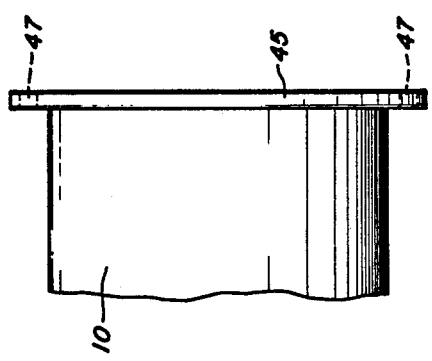
FIG. 8 is a cutaway side view of a module having alternative mounting means.

The modules can alternatively be secured together by means other than a tensile member. One such alternative is illustrated in FIG. 8 in which the body 10 includes on each end thereof an integral flange 45 having openings 47 disposed about the circumference of the flange and through which fasteners are insertable for securing mated ends together.

The mated modules may be supported for rotation on rollers 46. Typically, an array of three circumferentially spaced rollers is provided near each end of the conveyor body. Additional rollers can be provided as necessary, depending upon the length of the particular conveyor. Axial positioning of the conveyor body is maintained by horizontally disposed rollers 48 at each end of the body, these rollers being circumferentially spaced about the periphery of the body. A flange 50 is attached to the end modules of the conveyor and includes a circular surface 52 which is cooperative with the rollers 48 to maintain the axial position of the rotatable body. A slip seal can be machined or otherwise formed in the outer end of the outermost module. In the illustrated embodiment, the slip seal is in the form of an annular groove 54 into which an end of a feed tube 56 is inserted, and with respect to which the conveyor body is rotatable. The feed tube 56 is typically connected to a hopper 58 into which a product is fed (as shown by the arrow) for conveyance.

The drive assembly 60 includes sheaves 62 carried by and rotatable with a shaft 64 which is supported on bearing blocks 66 and which is driven by a motor (not shown). The shaft 64 is spaced from and parallel to the conveyor body, and each sheave 62 may be in association with a respective conveyor module. V-belts 68 couple the drive sheaves 62 to the conveyor modules and by which power is transmitted to the conveyor body for rotation thereof. In the illustrated embodiment, each of the modules is driven by an associated conveyor belt coupled to the drive assembly. All of the conveyor modules need not be driven, and the driven number will be determined in accordance with the motive force necessary to rotate the conveyor for particular applications.

If the modules of FIGS. 4–6 are employed, the sheaves 28 are operative to engage the V-belts 68 for driving the conveyor. It is appreciated that the conveyor can be driven by other than V-belts. For example, chain sprockets can be formed on or attached to the modules for cooperation with a chain drive.

Figure 10:
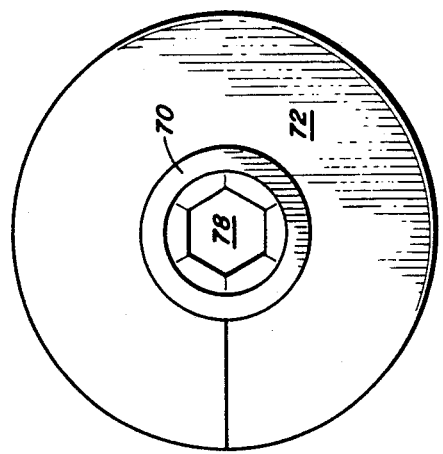
FIG. 10 is an end view of the module of FIG. 9.
Figure 9:
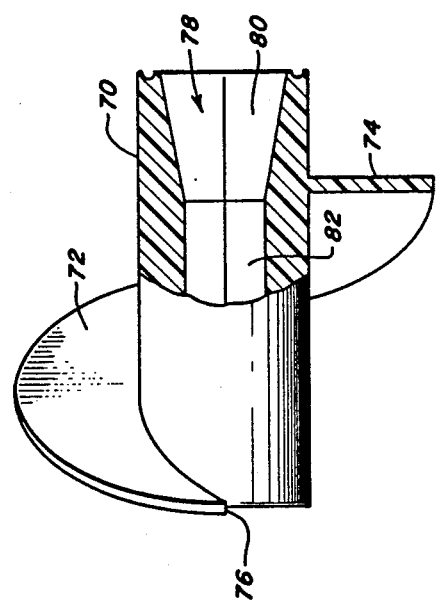
FIG. 9 is a sectional elevation view of a further embodiment of a screw conveyor module of the invention.

Another embodiment of the invention is shown in FIGS. 9 and 10 and includes a screw conveyor module having a central tube 70 of cylindrical exterior form, with a non-circular opening therethrough and with a web 72 helically disposed about the central tube. The helical web is slightly less in length than one helical pitch length, as described, and terminates at edges 74 and 76, these edges being adapted to confront corresponding edges of adjacent modules. The opening 78 through the central tube is of non-circular cross-section at end portions 80 and tapers to a non-circular cross-section at a central portion 82. This tapering is slight and is provided as "draft angle" to facilitate removal of the module from axially separable molds. The opening is configured to mate with a non-circular shaft which serves as a tensile member to lock the modules into axial engagement and which also serves as a positive drive shaft for rotation of the conveyor. In the embodiment of FIGS. 9 and 10, the opening is illustrated as hexagonal, although other noncircular shaped openings can be provided in tube 70 for use with a correspondingly shaped shaft to prevent rotation of the engaged modules relative to the shaft.

Figure 12:
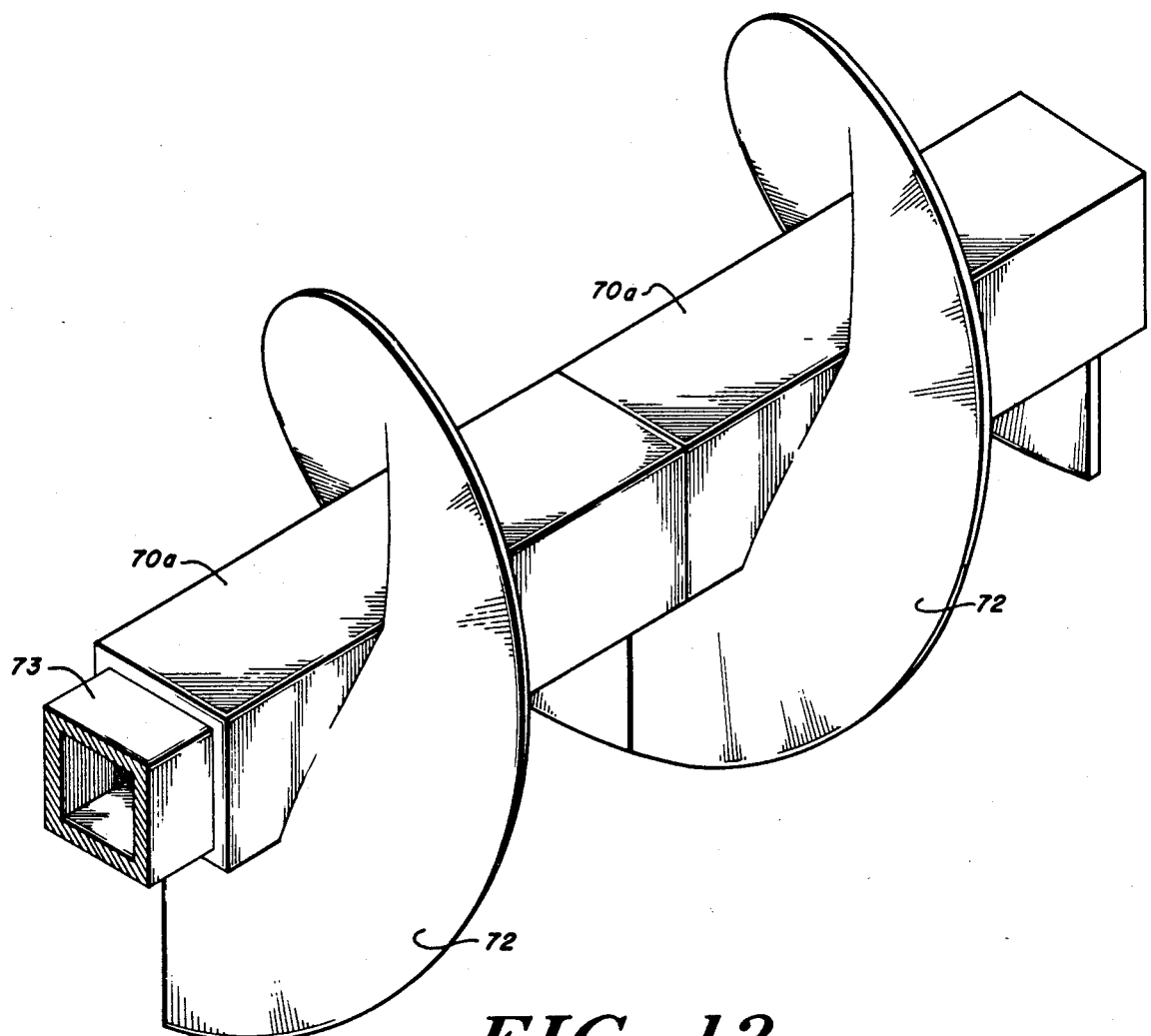
FIG. 12 is a pictorial view of a further embodiment of a screw conveyor module of the invention.

A module of alternative implementation is shown in FIG. 12 and includes a central tube 70a of square cross section and about which the helical web 72a is formed. The modules are assembled onto a square shaft 73 cooperative with the openings of tubes 70a.

Figure 11:
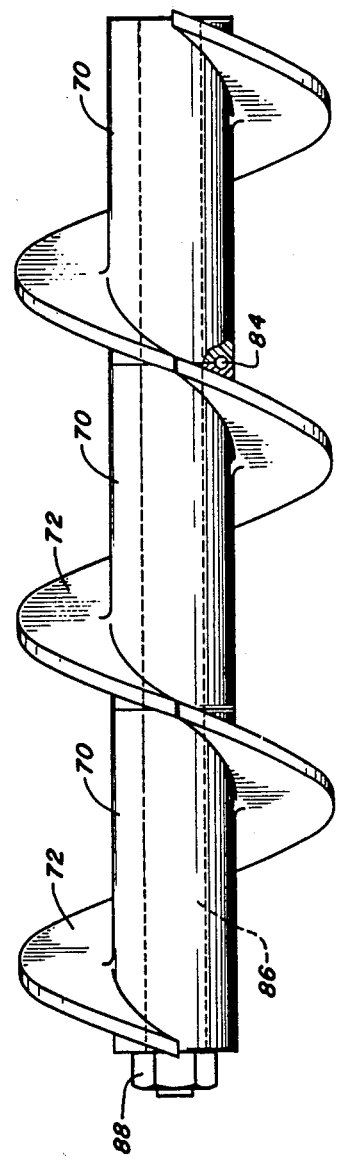
FIG. 11 is a side view of a screw conveyor embodying the invention and composed of the modules of FIGS. 9 and 10.

A screw conveyor composed of the modules of FIGS. 9 and 10 is shown in FIG. 11. Each of the modules is aligned with the ends of adjacent central tubes 70 in engagement with an interposed O-ring 84, and with the helical webs 72 having their ends confronting to provide an effectively continuous helical screw. A shaft 86 is fitted through the openings 80 through the tubes 70 and is secured by end fasteners, such as nuts 88 threaded onto threaded ends of shaft 86, which are tightened to provide an intended compressive force on the interconnected modules, as described above. This embodiment of FIG. 11 can be employed to retrofit existing metal screw conveyors without material change to the drive system.

The invention is not to be limited by what has been particularly shown or described except as indicated in the appended claims.

What is claimed is:

1. A screw conveyor composed of a plurality of like modules mated end-to-end, each of said plurality of modules being integrally molded and each of said plurality of modules comprising:
    a central tube having first and second ends and an opening extending therethrough between said first and second ends, said opening having a non-circular cross section;
    a helical web disposed around the outer surface of said central tube and integrally formed thereto, said helical web having a predetermined length and first and second ends extending axially outwardly of said first and second ends of said central tube, respectively, by a predetermined length;
    said first and second ends of said central tube having means for sealingly engaging adjacent ones of said plurality of like modules as mated end-to-end to form said screw conveyor to provide helical screw conveying surfaces disposed around an effectively continuous central tube;
    said first and second ends of said helical web having means for confronting corresponding means on adjacent ones of said plurality of like modules as mated end-to-end to form said screw conveyor to provide helical screw conveying surfaces disposed around an effectively continuous central tube;
    a tensile member extending through said openings of said effectively continuous central tube of said plurality of like modules mated end-to-end to form said screw conveyor, said tensile member having a non-circular cross section corresponding to said non-circular cross section of said opening of said central tube; and
    means for securing ends of said tensile member with respect to end ones of said plurality of like modules to maintain said plurality of like modules mated end-to-end in compressive mated engagement.

2. The screw conveyor of claim 1 wherein each said sealing engaging means of said first and second ends of said central tube includes an integral portion formed at each of said first and second ends.

3. The screw conveyor of claim 1 wherein each said confronting means of said first and second ends of said helical web is a surface integrally formed at said first and second ends for confronting corresponding means of said adjacent ones of said plurality of like modules mated end-to-end to form said screw conveyor.

4. The screw conveyor of claim 3 wherein each said surface on one of said first and second ends of said helical web is oppositely facing with respect to said surface on the other of said first and second ends of said helical web wherein each of said surfaces of said first and second ends of said helical web is mateable with an oppositely facing surface of an adjacent one of said plurality of like modules as mated end-to-end to form said screw conveyor.

5. The screw conveyor of claim 4 wherein said helical web has a predetermined thickness and said predetermined length of which each of said first and second ends of said helical web extends axially outwardly of said first and second ends of said central tube, respectively, is about one half of said predetermined thickness of said helical web, and further wherein said first and second ends of each said helical web lie in a radial plane.

6. The screw conveyor of claim 5 wherein said predetermined length of each said helical web is about one percent less than one helical pitch length.

7. The screw conveyor of claim 1 wherein end portions of each said opening extending through said central tube are tapered, and wherein each said end portion has a cross section corresponding to said non-circular cross section of said opening of said central tube.

8. A plastic screw conveyor, comprising:
    a plurality of integrally molded like modules mated end-to-end to form said plastic screw conveyor, each of said integrally molded modules including
    a central tube having a non-circular aperture extending therethrough and first and second ends, said non-circular aperture having a cross section,
    a helical web having a length about one percent less than one helical pitch length disposed around the outer surface of said central tube and integrally molded therewith, said helical web having first and second ends extending axially outwardly of said first and second ends of said central tube, respectively, by a predetermined length,
    each one of said first and second ends of said central tube having means for sealingly engaging adjacent ones of said plurality of integrally molded like modules as mated end-to-end to form said plastic screw conveyor to provide a helical screw conveying surface disposed around an effectively continuous central tube, said first and second ends of said helical web having means for confronting corresponding means on adjacent ones of said plurality of integrally molded like modules as mated end-to-end to form said plastic screw conveyor to provide a helical screw conveying surface disposed around an effectively continuous central tube, said plastic screw conveyor having a length determined by the number of integrally molded like modules mated end-to-end constituting said plurality of integrally molded like modules;

a drive shaft extending substantially the length of said screw conveyor through each of said non-circular apertures of said plurality of integrally molded like modules as mated end-to-end to form said plastic screw conveyor, said drive shaft having a non-circular cross-section corresponding to said cross section of said non-circular aperture, said non-circular cross section of said drive shaft cooperating with each of said non-circular apertures of said plurality of integrally molded like modules such that rotation of said drive shaft causes uniform rotation of said plurality of integrally molded like modules; and fastening means located at each end of said shaft to maintain said plurality of integrally molded like modules as mated end-to-end to form said plastic screw conveyor, and to allow limited axial movement of said plurality of integrally molded like modules on said drive shaft resulting from expansion and contraction of said plurality of integrally molded like modules due to changes in temperature.

9. The screw conveyor of claim 8 wherein said sealing engaging means of each one of said first and second ends of said central tube includes an integral portion formed at each one of said first and second ends.

10. The screw conveyor of claim 8 wherein each of said confronting means of said first and second ends of said helical web is a surface integrally formed at said first and second ends for confronting corresponding means of said adjacent ones of said plurality of integrally molded like modules mated end-to-end to form said screw conveyor and wherein said surface on one of said first and second ends of said helical web is oppositely facing with respect to said surface on the other of said first and second ends of said helical web such that each of said surfaces of said first and second ends of said helical web is mateable with an oppositely facing surface of an adjacent one of said plurality of integrally molded like modules as mated end-to-end to form said plastic screw conveyor.

11. The screw conveyor of claim 8 wherein said helical web has a predetermined thickness and said predetermined length by which each of said first and second ends of said helical web extends axially outwardly of said first and second ends of said central tube, respectively, is about one half of said predetermined thickness of said helical web, and further wherein said first and second ends of each said helical web lie in a radial plane.

12. The screw conveyor of claim 2 wherein said integral portion formed at each of said first and second ends of said central tube is a circular groove.

13. The screw conveyor of claim 12 wherein said sealing engaging measn includes an O-ring disposed in said circular grooves of adjacent ones of said plurality of like modules mated end-to-end to form said screw conveyor.

14. The screw conveyor of claim 9 wherein said integral portion formed at each one of said first and second ends of said central tube is a circular groove.

15. The screw conveyor of claim 14 wherein said sealing engaging means includes an O-ring disposed in said circular grooves of adjacent ones of said plurality of like modules mated end-to-end to form said screw conveyor.

* * * * *

UNITED STATES PATENT AND TRADEMARK OFFICE
CERTIFICATE OF CORRECTION

PATENT NO. : 4,852,719
DATED : August 1, 1989
INVENTOR(S) : James M. Lapeyre It is certified that error appears in the above-identified patent and that said Letters Patent is hereby corrected as shown below:

In the Abstract, line 7, "cylindircal" should read --cylindrical--.

In the Abstract, line 14, "non-circular and" should read --non-circular core and--.

In Column 1, line 53, "body which" should read --body and which--.

In Column 2, line 18, "many conveyors," should read --many metal conveyors,--.

In Column 6, line 39, "length of which" should read --length by which--.

In Column 8, line 30, "measn" should read --means--.

Signed and Sealed this

Twenty-third Day of June, 1992

Attest:

DOUGLAS B. COMER

*Attesting Officer*  *Acting Commissioner of Patents and Trademarks*